United States Patent
Kotecha et al.

(10) Patent No.: US 10,080,158 B2
(45) Date of Patent: Sep. 18, 2018

(54) PROVIDING MULTIPLE INTERFACES FOR TRAFFIC

(71) Applicants: Verizon Patent and Licensing Inc., Arlington, VA (US); Cellco Partnership, Arlington, VA (US)

(72) Inventors: Lalit R. Kotecha, San Ramon, CA (US); Sagiv Draznin, Wanut Creek, CA (US); Deepak Kakadia, Union City, CA (US); Jay J. Lee, San Ramon, CA (US); David Chiang, Fremont, CA (US); Patricia R. Chang, San Ramon, CA (US); Donna L. Polehn, Kirkland, WA (US); Thomas H. Tan, San Jose, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 151 days.

(21) Appl. No.: 13/706,939

(22) Filed: Dec. 6, 2012

(65) Prior Publication Data

US 2014/0162680 A1   Jun. 12, 2014

(51) Int. Cl.
*H04W 72/04* (2009.01)
*H04W 28/08* (2009.01)
*H04W 88/06* (2009.01)

(52) U.S. Cl.
CPC ............ *H04W 28/08* (2013.01); *H04W 88/06* (2013.01)

(58) Field of Classification Search
CPC ........... H04W 88/06; H04L 5/14; H04M 1/00; H04B 7/00
USPC ........................ 455/453, 552.1, 442; 370/310
See application file for complete search history.

(56) References Cited

U.S. PATENT DOCUMENTS

| | | | |
|---|---|---|---|
| 2008/0299979 A1* | 12/2008 | Ko et al. | 455/442 |
| 2010/0062800 A1* | 3/2010 | Gupta et al. | 455/552.1 |
| 2013/0137423 A1* | 5/2013 | Das et al. | 455/426.1 |

OTHER PUBLICATIONS

K. Sklower, The PPP Multilink Protocol (MP), Aug. 1996, University of California, Berkleley.*

* cited by examiner

*Primary Examiner* — Gary Lafontant

(57) ABSTRACT

A system may be configured to receive data. The system may be associated with a plurality of network interfaces that each correspond to a different radio access technology associated with one or more cellular networks. The system may identify one or more measures of load associated with each of the plurality of network interfaces; and output, based on the identified measures of load, a different portion of the received data to each network interface, of the group of network interfaces.

20 Claims, 6 Drawing Sheets

400 ⟶

| Interface ID | State | Throughput | Latency |
|---|---|---|---|
| 3G | Active | 2.9 Mbps | 298 ms |
| 4G | Active | 4.2 Mbps | 99 ms |
| WiFi | Inactive | 7.7 Mbps | 17 ms |

PROVIDING MULTIPLE INTERFACES FOR TRAFFIC

BACKGROUND

User devices, such as cellular telephones, often run applications (also known as "apps"), which may send and/or receive data to and/or from a network. Such applications may include gaming applications, web browsing applications, or the like. Some user devices may include multiple network interfaces, such as a third generation ("3G") cellular interface, a fourth generation ("4G") cellular interface, a wireless local area network interface (e.g., a "WiFi" interface), and/or other interfaces.

DETAILED DESCRIPTION OF PREFERRED EMBODIMENTS

The following detailed description refers to the accompanying drawings. The same reference numbers in different drawings may identify the same or similar elements.

A system and/or method, described herein, may allow a user device, such as a cellular telephone, to use multiple network interfaces when sending traffic associated with an application (e.g., a software application running on the user device). For example, the user device may include a load balancer (implemented via software and/or hardware) that receives data from the application and that is to be transmitted from the user device. The load balancer may identify characteristics (e.g., throughput, latency, and/or other characteristics) of various networks with which the user device is able to communicate. Based on these characteristics, the load balancer may segment the data into separate data units, and may transmit the segmented data units via multiple network interfaces.

Figure 1A:
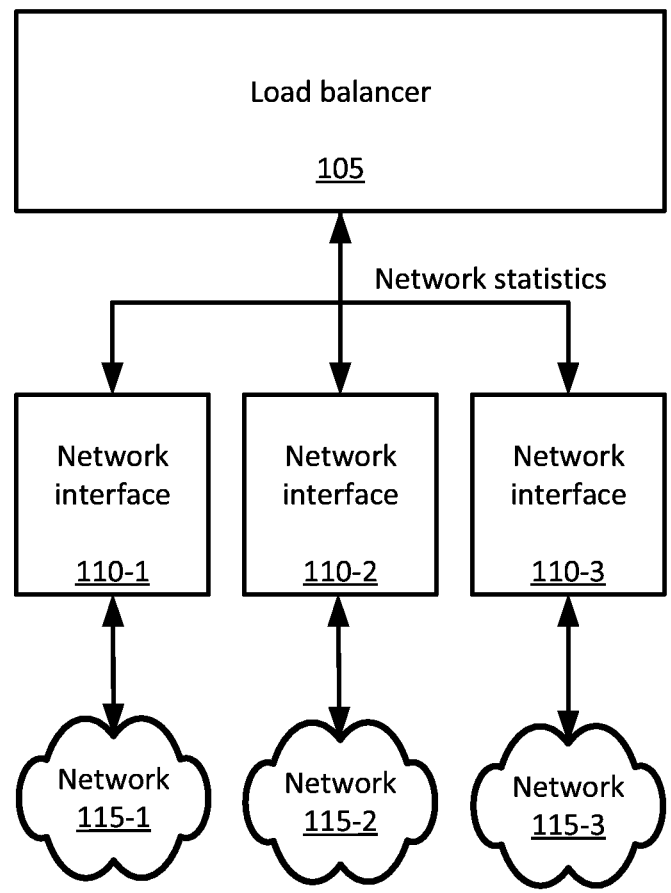
FIGS. 1A and 1B illustrate an overview of one or more example implementations described herein.
Figure 1B:
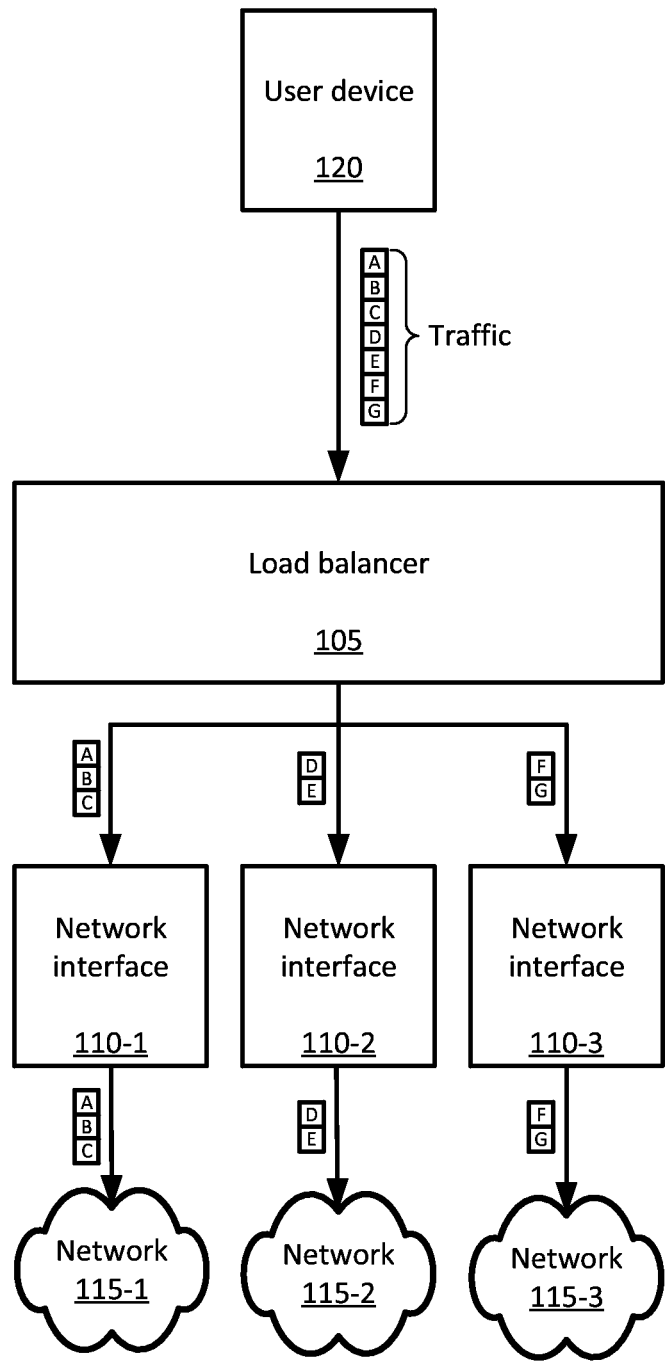

FIGS. 1A and 1B illustrate an overview of one or more example implementations described herein. As shown in FIG. 1A, load balancer 105 may be connected to multiple network interfaces 110-1 through 110-3 (hereinafter referred to collectively as "network interfaces 110," or individually as "network interface 110"). Load balancer 105 may be implemented as a software module, and/or via hardware, and may be included in a device, such as, for instance, a user device, a router, and/or some other device.

Via network interfaces 110, load balancer 105 may be able to transmit data to multiple networks 115-1 through 115-3 (hereinafter referred to collectively as "networks 115," or individually as "network 115"). These networks 115 may be different from each other, e.g., may implement different radio access technologies ("RATs"), may be operated by different entities, etc. For example, network 115-1 may implement a 3G RAT, network 115-2 may implement a 4G RAT, and network 115-3 may implement a WiFi RAT. In this situation, network interface 110-1 may include a 3G-capable radio transceiver, network interface 110-2 may include a 4G-capable radio transceiver, and network interface 110-3 may include a WiFi-capable radio transceiver. Networks 115 may be in communication with one or more other networks, such as the Internet.

In some implementations, load balancer 105 may analyze statistics associated with network interfaces 110 and/or networks 115. These statistics may indicate a load associated with network interfaces 110 and/or networks 115, and may be used to determine capabilities of network interfaces 110 and/or networks 115 to handle additional traffic. These statistics may include, for example, a measure of latency, a measure of throughput (e.g., download throughput and/or upload throughput), and/or some other statistic associated with a particular network interface 110 and/or a particular network 115.

As shown in FIG. 1B, load balancer may receive traffic from user device 120 (conceptually illustrated in FIG. 1B as six data units). Load balancer 105 may determine, based on the statistics associated with network interfaces 110 and/or networks 115, that multiple network interfaces 110 have available capacity to handle the traffic received from user device 120. For example, referring to the example shown in FIG. 1B, assume that load balancer determines that network interface 110-1 has more capacity (e.g., higher available throughput and/or lower latency) than network interface 110-2, and that network interface 110-2 has more capacity than network interface 110-3. As shown in this example, load balancer 105 may segment the received traffic into three segments, one segment having three data units, one segment having two data units, and one segment having one data unit. Load balancer 105 may output the largest segment to network interface 110-1, the next largest segment to network interface 110-2, and the smallest segment to network interface 110-3. Network interfaces 110 may, in turn, output these segments of traffic to corresponding networks 115.

In some implementations, load balancer 105 may transmit data to network interfaces 110 via a stateful connection, such as a transmission control protocol ("TCP") connection. In some implementations, load balancer 105 may transmit data to network interfaces 110 via a stateless connection, such as a user datagram protocol ("UDP") connection.

By segmenting data and transmitting the segments over multiple network interfaces 110, some implementations described herein may provide additional throughput and/or better latency to network applications, thus improving performance of such applications, which may enhance users' experiences. That is, instead of limiting network applications to sending and/or receiving data over a single network interface, some implementations described herein may allow network applications to make use of network interfaces that would otherwise be idle. This may allow a user device's theoretical throughput to approximately equal the sum of the throughputs of the network interfaces associated with the user device.

Furthermore, in some implementations, load balancer 105 may receive data from an application, without any calls from the application to load balancer 105, or any knowledge of load balancer 105 by a programmer of the software application. For instance, in some implementations, load balancer 105 may be implemented in firmware of a user device, and/or implemented in a router that is communicatively coupled to the user device. Since load balancer 105 does not need any specific calls or instructions from software applications in order to intercept and segment traffic associated with these applications, such a load balancer 105 may be implemented without requiring modification of existing applications, or any need for programmers of such applications to design or redesign these applications for operation with load balancer 105.

Figure 2A:
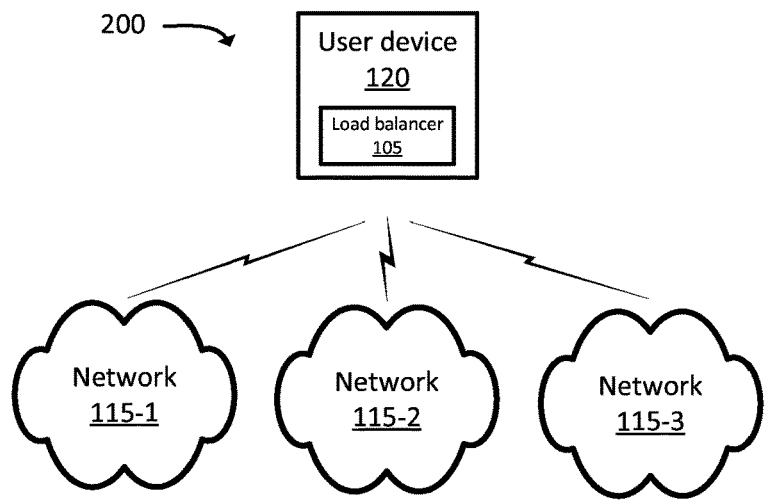
FIGS. 2A and 2B illustrate example environments in which systems and/or methods, described herein, may be implemented.
Figure 2B:
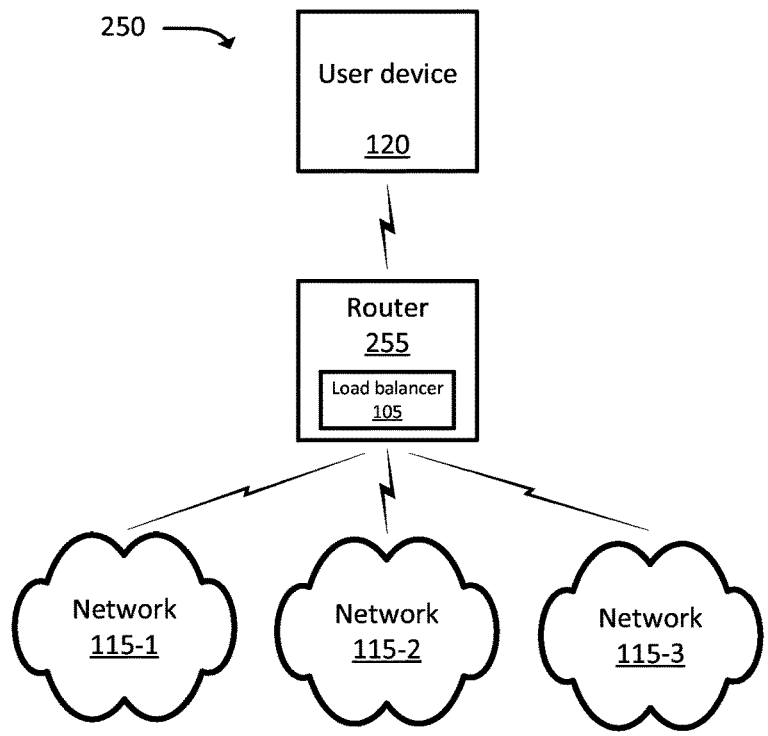

FIGS. 2A and 2B illustrate example environments 200 and 250, in which systems and/or methods described herein may be implemented. As shown in FIG. 2A, environment 200 may include networks 115 and user device 120.

Networks 115 may include one or more wired and/or wireless networks. For example, networks 115 may include a cellular network, a public land mobile network ("PLMN"), a second generation ("2G") network, a 3G network, a 4G network, a fifth generation ("5G") network, a WiFi network (e.g., a network that implements a wireless local area network ("WLAN"), such as a network that conforms to an IEEE 802.11 standard) and/or another network. Additionally, or alternatively, networks 115 may include a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Different ones of networks 115 may be associated with different RATs. For example, network 115-1 may be associated with a 3G RAT, network 115-2 may be associated with a 4G RAT, and network 115-3 may be associated with a WiFi RAT. In some implementations, networks 115 may correspond to radio access networks ("RANs"), such as RANs associated with a cellular network. User device 120 may access another network, such as the Internet, via each of networks 115.

Networks 115 may be connected to one or more service providers. Service providers may include one or more server devices, or other types of computation and communication devices, that provide content. For example, a service provider may host a website that can be accessed, by user device 120, to receive a service. The service may, for example, correspond to content (e.g., applications, web pages, video, audio, images, games, advertising content, text, data, and/or some combination thereof), a messaging service (e.g., email, instant message, etc.), a banking service, an electronic sales transaction service, etc.

User device 120 may include any computation and communication device, such as a wireless mobile communication device that is capable of communicating with multiple networks (such as with networks 115). For example, user device 120 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 120 may send traffic to and/or receive traffic from networks 115 via network interfaces associated with user device 120. These network interfaces may include, for instance, wireless radio transceivers, ports for wired connections (e.g., RJ-45 Ethernet jacks or the like), or other interfaces.

In some implementations, user device 120 may include some or all of the functionality associated with load balancer 105. In some such implementations, environment 200 may include multiple user devices 120, each of which may include a separate instance of load balancer 105.

As shown in FIG. 2B, environment 250 may include networks 115, user device 120, and router 255. As discussed above, networks 115 may include one or more access networks (e.g., a RAN of a cellular network), and user device 120 may include any computation and communication device, such as a wireless mobile communication device. User device 120 may include a communication interface (e.g., a wired interface and/or a wireless interface), through which user device 120 may send and/or receive data to and/or from networks 115 via router 255.

Router 255 may include a network device that receives traffic from one or more sources (e.g., from networks 115 and/or from user device 120), and forwards the traffic to an appropriate destination. For example, router 255 may include a router, a switch, a hub, and/or another type of device that performs network routing functionality. Router 255 may include multiple network interfaces, thorough which router 255 may send and/or receive data to and/or from networks 115.

For instance, router 255 may receive traffic from user device 120, which is to be sent to a destination (e.g., another device) via the Internet. The traffic may indicate an address (e.g., an Internet protocol ("IP") address associated with the destination. Router 255 may forward the traffic to the destination via one or more of networks 115. In some implementations, router 255 may implement some or all of the functionality of load balancer 105. In some such implementations, router 255 may segment traffic received from user device 120, and may transmit the segmented traffic to an associated destination via respective networks 115. In some implementations, router 255 may receive traffic, from networks 115, that is intended for user device 120. In some such implementations, router 255 may forward the traffic to user device 120, without performing functionality associated with load balancer 105. That is, in some implementations, load balancer 105 may only perform load balancing functionality on traffic being transmitted from user device 120.

The quantity of devices and/or networks, illustrated in FIGS. 2A and 2B, is provided for explanatory purposes only. In practice, there may be additional devices and/or networks; fewer devices and/or networks; different devices and/or networks; or differently arranged devices and/or networks than illustrated in FIGS. 2A and 2B. Alternatively, or additionally, one or more of the devices of environments 200 and/or 250 may perform one or more functions described as being performed by another one or more of the devices of environments 200 and/or 250. Devices of environments 200 and/or 250 may interconnect via wired connections, wireless connections, or a combination of wired and wireless connections.

Figure 3:
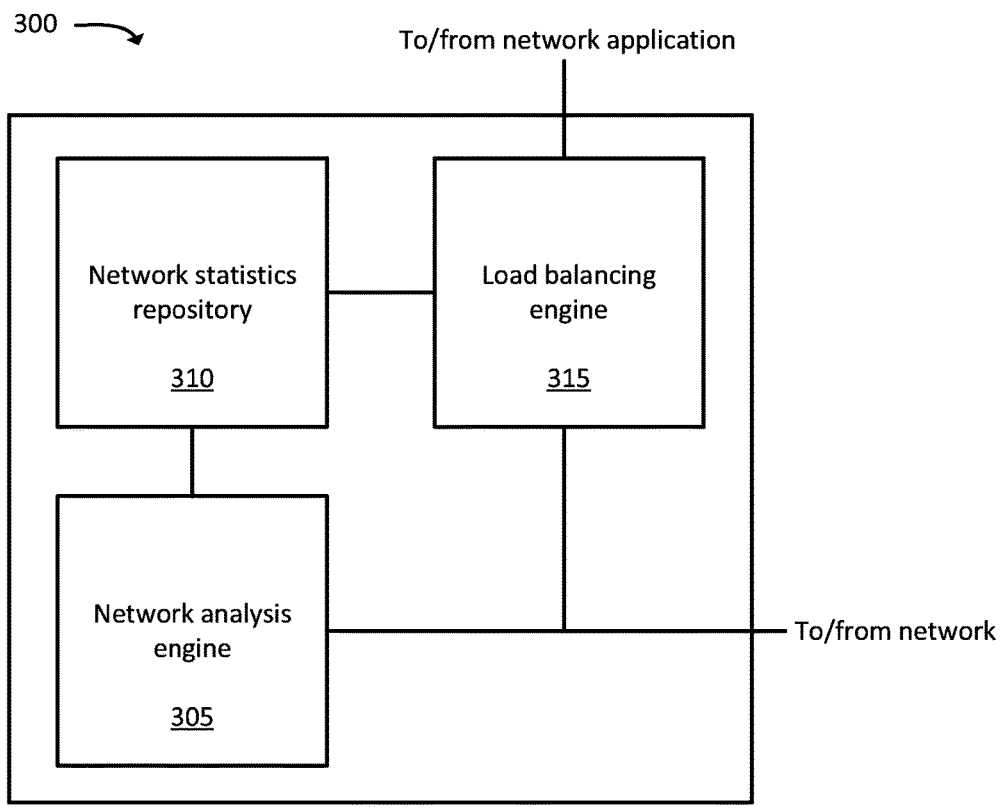
FIG. 3 illustrates example functional components of a load balancer, according to one or more implementations described herein.

FIG. 3 is a diagram of example functional components of system 300. In some implementations, system 300 may correspond to, for example, load balancer 105. As shown in FIG. 3, system 300 may include reference network analysis engine 305, network statistics repository 310, and load balancing engine 315. Any, or all, of modules 305-315 may be implemented by one or more memory devices and/or one or more processors. Furthermore, multiple modules may be associated with the same memory device and/or processor (e.g., one memory device, or one set of memory devices, may store information associated with at least two different ones of modules 305-315).

Network analysis engine 305 may compute measure(s) of load associated with one or more network interfaces 110, with which load balancer 105 may be in communication. For example, network analysis engine 305 may compute a measure of latency, a measure of throughput (e.g., download throughput and/or upload throughput), and/or another measure of load associated with network interfaces 110. When identifying the measure of latency associated with a particular network interface 110, network analysis engine 305 may send a message to a device that provides a latency-measuring mechanism (e.g., a server that supports a "ping" message) via the particular network interface 110. The measure of latency may indicate an amount of time between sending the message and receiving a response (also known as "round trip" time).

In some implementations, network analysis engine 305 may compute a measure of throughput (e.g., upload throughput) associated with a particular network interface 110, by sending data (or analyzing statistics relating to data sent by another component) via the particular network interface 110. Network analysis engine 305 may compute the throughput based on the size of the data (e.g., as expressed in megabytes, megabits, bytes, bits, or some other measure) and an amount of time needed to output the data via the network interface (e.g., an amount of time between starting and finishing transmission of the data).

In some implementations, network analysis engine 305 may compute or identify other measures of load associated with network interfaces 110. For example, assume that a particular network interface communicates with a network via a cellular RAT, such as 4G. In this example, network analysis engine 305 may communicate with a base station of the network (e.g., may send control messages) in order to determine resources of the network that are available. For example, communications from the base station may indicate a measure of available throughput associated with the base station, a number of resource blocks ("RBs") associated with the base station, or some other measure of load and/or available resources associated with the base station.

In some implementations, network analysis engine 305 may compute the measure(s) of load associated with network interfaces 110 on a periodic basis (e.g., every ten minutes, every hour, every twelve hours, every day, every week, or at some other interval). In some implementations, network analysis engine 305 may compute measure(s) of load associated with one network interface 110 at a different interval than another network interface 110. For example, if a measure of load associated with a first network interface 110 varies less than a measure of load associated with a second network interface 110, network analysis engine 305 may compute the measure of load associated with the second network interface 110 more often than computing the measure of load associated with the first network interface 110.

In some implementations, network analysis engine 305 may compute the measure(s) of load associated with a particular network interface 110 more often when a certain amount of data is being transmitted via the particular network interface 110 than when less data is being transmitted via the particular network interface 110, or when the particular network interface 110 is idle. In some implementations, network analysis engine 305 may compute the measure(s) of load associated with a particular network interface 110 less often when a certain amount of data is being transmitted via the particular network interface 110 than when less data is being transmitted via the particular network interface 110, or when the particular network interface 110 is idle.

In some implementations, network analysis engine 305 may determine whether a particular network interface 110 is active or inactive (e.g., powered on or powered off). Network analysis engine 305 may receive this information from one or more devices (e.g., user device 120 may provide information to network analysis engine 305 indicating that the particular network interface 110 is powered off). Additionally, or alternatively, network analysis engine 305 may determine that a particular network interface 110 is inactive if data has not been received via the particular network interface 110 for a predetermined length of time (e.g., if a ping message has timed out). In some implementations, network analysis engine 305 may determine that a particular network interface 110 is active if data has been received via the particular network interface 110 within a predetermined length of time, and/or if network analysis engine 305 has received information from a device indicating that the particular network interface 110 is active.

In some implementations, network analysis engine 305 may output information regarding the computed measure(s) of load to network statistics repository 310. In some implementations, network statistics repository 310 may output the information regarding the computed measure(s) of load to one or more other devices.

Figures 4, 5:
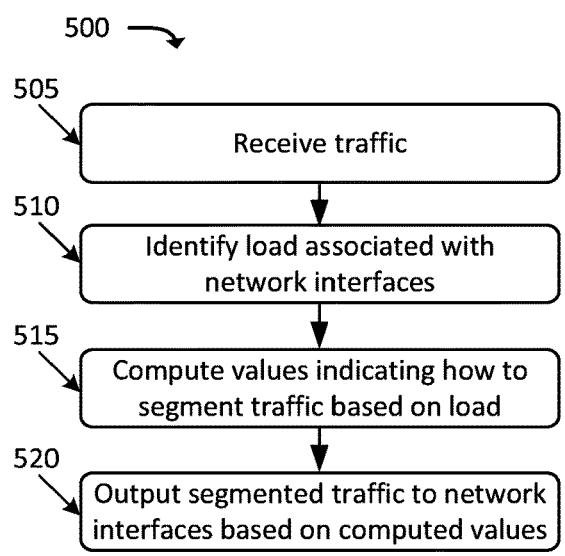
FIG. 4 illustrates an example data structure that may be stored by one or more devices, according to one or more implementations described herein.
FIG. 5 illustrates an example process for sending traffic via multiple network interfaces, according to one or more implementations described herein.

Network statistics repository 310 may store information regarding measures of load associated with one or more network interfaces 110. FIG. 4 illustrates an example data structure 400, which may be stored by network statistics repository 310. As shown in FIG. 4, data structure 400 may store information regarding an interface identifier ("Interface ID"), a state of a network interface 110, a throughput associated with a network interface, and a latency associated with a network interface.

As shown in FIG. 4, an interface identifier field may include an identification of a RAT associated with a particular network interface 110. Additionally, or alternatively, the interface identifier may include other identifying information for network interfaces 110. The state field may include information indicating whether a particular network interface 110 is active or inactive. The throughput field may indicate a measure of throughput associated with a particular network interface 110 (e.g., an upload throughput), and may be expressed in terms of, for example, megabits per second ("Mbps"). The latency field may indicate a measure of latency associated with a particular network interface 110, and may be expressed in terms of, for example, milliseconds ("ms").

As mentioned above, network analysis engine 305 may identify other measures of load associated with network interfaces 110 in addition to, or in lieu of, the measures of load described with respect to FIG. 4. In some such implementations, data structure 400 may be modified to include information regarding these other measures of load.

Returning to FIG. 3, load balancing engine 315 may perform load balancing operations on traffic associated with network applications. In some implementations, load balancing engine 315 may be implemented as a part of (e.g., a software module and/or a hardware module on) user device 120. In some such implementations, load balancing engine 315 may be implemented in firmware of user device 120, and may receive (or intercept) data, from the network application, which is to be output from user device 120. In some implementations, load balancing engine 315 may be implemented as part of (e.g., a software module and/or a hardware module on) router 255. In some such implementations, load balancing engine 315 may receive traffic, associated with network applications, from user devices 120 on which the network applications are running.

Load balancing engine 315 may identify network interfaces 110 that are available, over which the traffic may be transmitted. For instance, load balancing engine 315 may receive information from network statistics repository 310 regarding a set of network interfaces 110 (e.g., a set of multiple network interfaces 110), which are associated with system 300 (e.g., network interfaces 110 associated with user device 120 and/or router 255). The information may indicate, for example, a status of network interfaces 110 and/or measures of load (e.g., information regarding used or available resources) associated with network interfaces 110. Based on the information regarding the set of network interfaces 110, load balancing engine 315 may compute a set of values, which may indicate how to segment traffic associated with the network application.

In one implementation, in order to compute the set of values, load balancing engine 315 may identify a proportion of available throughput associated with network interfaces 110. For example, assume that load balancing engine 315 identifies that network interface 110-1 is associated with 2.9 Mbps of available throughput, that network interface 110-2 is associated with 4.2 Mbps of available throughput, and that network interface 110-3 is associated with 7.7 Mbps of available throughput. Load balancing engine 315 may generate a set of values based on these measures of available throughput, such as by calculating proportions of total available throughput (out of 14.8 (i.e., 2.9+4.2+7.7) Mbps, in this example). In some such implementations, load balancing engine 315 may generate a value of 0.20 (2.9/14.8) for network interface 110-1, 0.28 (4.2/14.8) for network interface 110-2, and 0.52 (7.7/14.8) for network interface 110-3.

Load balancing engine 315 may use these computed values when segmenting traffic, associated with the network application, and outputting the segments via network interfaces 110. Continuing with the above example, load balancing engine 315 may output approximately 20% of the traffic, associated with the network application, to network interface 110-1, approximately 28% of the traffic to network interface 110-2, and approximately 52% of the traffic to network interface 110-3.

While an example of computing values based on available throughput was discussed above, in some implementations, load balancing engine 315 may compute these values using additional, or alternative, measures of load. For example, in some implementations, load balancing engine 315 may compute these values based on measures of latency in addition to, or in lieu of, computing these values based on measures of throughput.

In some implementations, load balancing engine 315 may periodically adjust the computed values, or compute new values. For example, load balancing engine 315 may receive information from network statistics repository 310 on a periodic basis (e.g., every minute, every hour, or at some other interval), and may compute new values based on the periodically received information. By periodically adjusting or re-computing these values, load balancing engine 315 may segment traffic in a manner that is consistent with changing load conditions associated with network interfaces 110.

In some implementations, load balancing engine 315 may compute values differently for different applications. For example, load balancing engine 315 may identify a type of network application associated with traffic (e.g., may inspect headers and/or payloads of packets included in the traffic), and may compute values based on the type of network application. For instance, for time-sensitive applications (e.g., games, voice and/or video calls, etc.), load balancing engine 315 may more heavily weight measures of latency when computing the values. For other applications (e.g., video streaming, file transferring, etc.), load balancing engine 315 may less heavily weight (or not use) measures of latency when computing the values. Furthermore, while examples of computed values are presented above as proportions out of total available resources, in some implementations, load balancing engine 315 may compute the values using additional, or different, mathematical functions.

FIG. 5 illustrates an example process 500 for segmenting traffic, and outputting the segmented traffic via multiple network interfaces. In one example implementation, process 500 may be performed by load balancer 105 (e.g., by one or more of modules 305-315 described above with respect to FIG. 3). In another example implementation, some or all of process 500 may be performed by a device or collection of devices separate from, or in combination with, load balancer 105. For instance, as mentioned above, load balancer 105 may be implemented as part of user device 120, and/or as part of router 255.

Process 500 may include receiving traffic (block 505). For example, load balancer 105 may receive traffic from a network application. The traffic may correspond to, for example, a video streaming application, a voice call, a video call, a game, or some other application.

Process 500 may also include identifying measures of load associated with network interfaces (block 510). For example, as described above with respect to load balancing engine 315, load balancer 105 may identify measures of load and/or resource availability associated with network interfaces 110, which may be network interfaces that are associated with user device 120 and/or router 255.

Process 500 may additionally include computing values that indicate how to segment the received traffic based on the load (block 515). For example, as described above with respect to load balancing engine 315, load balancer 105 may compute values based on available throughput, measures of latency, and/or other measures of load and/or resource availability.

Process 500 may further include outputting the segmented traffic to the network interfaces based on the computed values (block 520). For example, as described above with respect to load balancing engine 315, load balancer 105 may output different portions of the traffic, received at block 505, to different network interfaces 110, based on the values computed at block 515. That is, load balancer 105 may output different portions of the traffic to different network interfaces 110 based on measures of load and/or available resources associated with network interfaces 110.

In some implementations, the traffic that is output at block 520 may be received by one or more devices (e.g., a destination device), via a network that is communicatively coupled to networks associated with the network interfaces identified at block 510. For example, assume that two network interfaces 110 were identified block 510, and that these network interfaces 110 correspond to, for example, a WiFi network and a 4G network. In some implementations, the WiFi network and the 4G network may be communicatively coupled to another network, such as the Internet. Further assume that the traffic, outputted at block 520, is to be output to a server device, which is accessible through the Internet. User device 120 may output the traffic (at block 520) via the two network interfaces 110. The server device may receive this traffic via the Internet (e.g., via a single network interface, or multiple network interfaces, that is/are connected to the Internet). In some implementations, the server device may process this traffic normally (e.g., no different than if the traffic had been outputted from user device 120 through one network interface).

In some implementations, load balancer 105 may add additional information to traffic before outputting segmented traffic (at 520). For example, load balancer 105 may add additional information to packets in the segmented traffic, indicating an order in which the packets should be processed. In some such implementations, a device and/or application may receive packets outputted by user device 120 (at block 520), and may reorder the received packets based on the additional information inserted by load balancer 105.

The device(s) and processes described above may allow a user device, such as a cellular telephone, to use multiple network interfaces when sending traffic associated with an application (e.g., a software application running on the user device). For example, the user device may include a load balancer (implemented via software and/or hardware) that receives data, to be transmitted from the user device, from the application. The load balancer may identify characteristics (e.g., throughput, latency, and/or other characteristics) of various networks with which the user device is able to communicate. Based on these characteristics, the load balancer may segment the data into separate data units, and may transmit the segmented data via multiple network interfaces.

Figure 6:
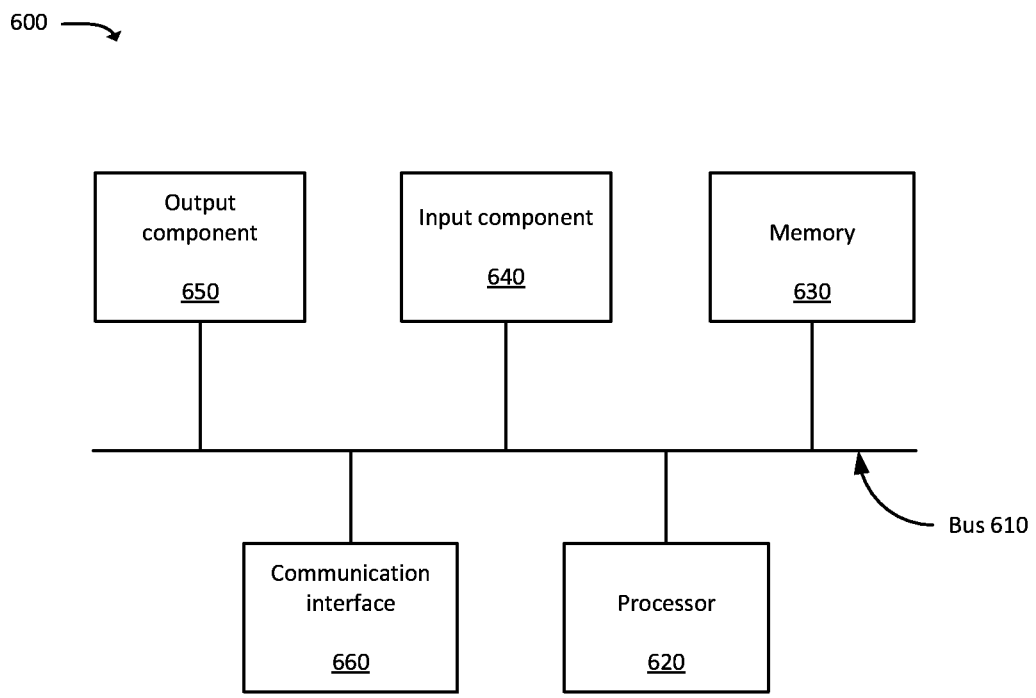
FIG. 6 illustrates example components of one or more devices shown in FIGS. 2A and 2B.

FIG. 6 is a diagram of example components of device 600. Each of the devices illustrated in FIG. 1 or 2 may include one or more devices 600. Device 600 may include bus 610, processor 620, memory 630, input component 640, output component 650, and communication interface 660. In another implementation, device 600 may include additional, fewer, different, or differently arranged components. Some non-limiting examples of device 600, with additional and/or different components, are discussed below.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 5, the order of the blocks may be modified in other implementations. Further, non-dependent blocks may be performed in parallel.

Furthermore, while an example of a data structure has been described above with respect to FIG. 4, data structures of some implementations may store additional, different, differently arranged, or less information than the examples provided above. Additionally, while these example data structures are presented as tables, any other data structure may be used, such as a linked list, a tree, a hash table, an array, and/or any other type of data structure. It will be apparent that embodiments, as described above, may be implemented in many different forms of software, firmware, and hardware in the implementations illustrated in the figures.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
executing, by a device, a first application for which latency is prioritized over throughput,
wherein the first application includes at least one of:
a gaming application,
a voice call application, or a video call application,
wherein the first application is associated with a first weight associated with latency;
executing, by the device, a second application for which throughput is prioritized over latency,
wherein the second application includes at least one of:
a video streaming application, or
a file transfer application,
wherein the second application is associated with a second weight associated with latency, the first and second weights being different,
wherein the device is associated with at least a first network interface capable of communicating via a first network, and a second network interface capable of communicating via a second network;
wherein the first and second network interfaces are associated with different radio access technologies;
receiving, from the first application, first data that is to be output from the device, and
receiving, from the second application, second data that is to be output from the device;
identifying, by the device, a measure of latency associated with each of the first and second network interfaces;
determining, by the device, that the first network interface is associated with a lower measure of latency than a measure of latency associated with the second network interface;
identifying, by the device, a measure of throughput associated with each of the first and second network interfaces;
determining, by the device, that the second network interface is associated with a higher measure of throughput than a measure of throughput associated with the first network interface;
segmenting the first data, from the first application, into:
a first set of segments to be output via the first network interface, and
a second set of segments to be output via the second network interface,
wherein the first set of segments includes more data than the second set of segments, based on the first application being associated with a higher priority for latency than for throughput,
wherein the segmenting of the first data is further performed based on the first weight;
segmenting the second data, from the second application, into:
a third set of segments to be output via the first network interface, and
a fourth set of segments to be output via the second network interface,
wherein the fourth set of segments includes more data than the third set of segments, based on the second application being associated with a higher priority for throughput than for latency,
wherein the segmenting of the second data is further performed based on the second weight;
outputting, by the device, the first and third sets of segments via the first network interface; and
outputting, by the device, the second and fourth sets of segments via the second network interface.

2. The method of claim 1, wherein a proportion of (a) data in the first set of segments, to (b) data in the second set of segments, is partially based on:
a proportion of (a) the measure of throughput associated with the first interface, and (b) the measure of throughput associated with the second interface.

3. The method of claim 2, wherein the proportion of (a) data in the first set of segments, to (b) data in the second set of segments, is further based on:
a proportion of (a) the measure of latency associated with the first interface, and (b) the measure of latency associated with the second interface.

4. The method of claim 1, further comprising:
adding additional information to the segmented first data and the segmented second data, the additional information indicating an order in which the segmented first data and the segmented second data should be processed by a recipient of the segmented first data and the segmented second data.

5. The method of claim 4, wherein the recipient of the segmented first data receives the segmented data in a particular order, and reorders the received segmented data based on the additional information added to the segmented first data.

6. The method of claim 1, wherein the proportion of (a) data in the first set of segments, to (b) data in the second set of segments, is based on:
a proportion of (a) the measure of latency associated with the first interface, and (b) the measure of latency associated with the second interface.

7. The method of claim 1, further comprising:
receiving information indicating a first measure of available resources associated with the first network; and
receiving information indicating a second measure of available resources associated with the second network,
wherein the segmentation of the first and second data is further performed based on the first and second measures of available resources associated with the first and second networks, respectively.

8. A device, comprising:
a non-transitory computer-readable medium storing a set of processor-executable instructions; and
one or more processors configured to execute the processor-executable instructions, wherein executing the processor-executable instructions causes the one or more processors to:
execute a first application for which latency is prioritized over throughput,
wherein the first application includes at least one of:
a gaming application,
a voice call application, or
a video call application,
wherein the first application is associated with a first weight associated with latency;
execute a second application for which throughput is prioritized over latency,
wherein the second application includes at least one of:
a video streaming application, or
a file transfer application,
wherein the second application is associated with a second weight associated with latency, the first and second weights being different,
wherein the device is associated with at least a first network interface capable of communicating via a first network, and a second network interface capable of communicating via a second network;
wherein the first and second network interfaces are associated with different radio access technologies;
receive, from the first application, first data that is to be output from the device, and receive, from the second application, second data that is to be output from the device;
identify a measure of latency associated with each of the first and second network interfaces;
determine that the first network interface is associated with a lower measure of latency than a measure of latency associated with the second network interface;
identify a measure of throughput associated with each of the first and second network interfaces;
determine that the second network interface is associated with a higher measure of throughput than a measure of throughput associated with the first network interface;
segment, based on the first weight, the first data, from the first application, into:
a first set of segments to be output via the first network interface, and
a second set of segments to be output via the second network interface,
wherein the first set of segments includes more data than the second set of segments, based on the first application being associated with a higher priority for latency than for throughput;
segment, based on the second weight, the second data, from the second application, into:
a third set of segments to be output via the first network interface, and
a fourth set of segments to be output via the second network interface,
wherein the fourth set of segments includes more data than the third set of segments, based on the second application being associated with a higher priority for throughput than for latency;
output the first and third sets of segments via the first network interface; and
output the second and fourth sets of segments via the second network interface.

9. The device of claim 8, wherein a proportion of (a) data in the first set of segments, to (b) data in the second set of segments, is partially based on:
a proportion of (a) the measure of throughput associated with the first interface, and (b) the measure of throughput associated with the second interface.

10. The device of claim 9, wherein the proportion of (a) data in the first set of segments, to (b) data in the second set of segments, is further based on:
a proportion of (a) the measure of latency associated with the first interface, and (b) the measure of latency associated with the second interface.

11. The device of claim 8, wherein the set of processor-executable instructions further includes processor-executable instructions that cause the one or more processors to:
add additional information to the segmented first data and the segmented second data, the additional information indicating an order in which the segmented first data and the segmented second data should be processed by a recipient of the segmented first data and the segmented second data.

12. The device of claim 11, wherein the recipient of the segmented first data receives the segmented data in a particular order, and reorders the received segmented data based on the additional information added to the segmented first data.

13. The device of claim 8, wherein executing the processor-executable instructions further causes the one or more processors to:
receive information indicating a first measure of available resources associated with the first network; and
receive information indicating a second measure of available resources associated with the second network,
wherein the segmentation of the first and second data is further performed based on the first and second measures of available resources associated with the first and second networks, respectively.

14. A non-transitory computer-readable medium storing a set of processor-executable instruction, wherein execution of the processor-executable instructions, by one or more processors of a device, causes the one or more processors to:
execute a first application for which latency is prioritized over throughput,
wherein the first application includes at least one of:
a gaming application,
a voice call application, or
a video call application,
wherein the first application is associated with a first weight associated with latency;
execute a second application for which throughput is prioritized over latency,
wherein the second application includes at least one of:
a video streaming application, or
a file transfer application,
wherein the second application is associated with a second weight associated with latency, the first and second weights being different,
wherein the device is associated with at least a first network interface capable of communicating via a first network, and a second network interface capable of communicating via a second network;
wherein the first and second network interfaces are associated with different radio access technologies;
receive, from the first application, first data that is to be output from the device, and
receive, from the second application, second data that is to be output from the device;
identify a measure of latency associated with each of the first and second network interfaces;
determine that the first network interface is associated with a lower measure of latency than a measure of latency associated with the second network interface;
identify a measure of throughput associated with each of the first and second network interfaces;
determine that the second network interface is associated with a higher measure of throughput than a measure of throughput associated with the first network interface;
segment, based on the first weight, the first data, from the first application, into:
a first set of segments to be output via the first network interface, and
a second set of segments to be output via the second network interface,
wherein the first set of segments includes more data than the second set of segments, based on the first application being associated with a higher priority for latency than for throughput;
segment, based on the second weight, the second data, from the second application, into:
a third set of segments to be output via the first network interface, and
a fourth set of segments to be output via the second network interface,
wherein the fourth set of segments includes more data than the third set of segments, based on the second application being associated with a higher priority for throughput than for latency;

output the first and third sets of segments via the first network interface; and output the second and fourth sets of segments via the second network interface.

15. The non-transitory computer-readable medium of claim 14, wherein a proportion of (a) data in the first set of segments, to (b) data in the second set of segments, is partially based on:

a proportion of (a) the measure of throughput associated with the first interface, and (b) the measure of throughput associated with the second interface.

16. The non-transitory computer-readable medium of claim 15, wherein the proportion of (a) data in the first set of segments, to (b) data in the second set of segments, is further based on:

a proportion of (a) the measure of latency associated with the first interface, and (b) the measure of latency associated with the second interface.

17. The non-transitory computer-readable medium of claim 14, wherein the set of processor-executable instructions further includes processor-executable instructions that cause the one or more processors to:

add additional information to the segmented first data and the segmented second data, the additional information indicating an order in which the segmented first data and the segmented second data should be processed by a recipient of the segmented first data and the segmented second data.

18. The non-transitory computer-readable medium of claim 17, wherein the additional information enables a recipient of the segmented first data to receive the segmented data in a particular order, and reorder the received segmented data based on the additional information added to the segmented first data.

19. The non-transitory computer-readable medium of claim 14, wherein the proportion of (a) data in the first set of segments, to (b) data in the second set of segments, is based on:

a proportion of (a) the measure of latency associated with the first interface, and (b) the measure of latency associated with the second interface.

20. The non-transitory computer-readable medium of claim 14, wherein the set of processor-executable instructions further includes processor-executable instructions that cause the one or more processors to:

receive information indicating a first measure of available resources associated with the first network; and receive information indicating a second measure of available resources associated with the second network, wherein the segmentation of the first and second data is further performed based on the first and second measures of available resources associated with the first and second networks, respectively.

\* \* \* \* \*